United States Patent Office 3,321,293
Patented May 23, 1967

3,321,293
METHOD OF DEFOLIATING COTTON PLANTS
Anthony A. Sousa, Raleigh, N.C., assignor to Union Carbide Corporation, a corporation of New York
No Drawing. Filed Apr. 29, 1964, Ser. No. 363,591
3 Claims. (Cl. 71—2.5)

This invention relates to methods and compositions for defoliating cotton plants.

It has long been known to treat crop plants chemically with the object of inducing defoliation and thereby facilitating harvesting of the crop by mechanical means. However, most of the chemicals used heretofore, particularly inorganic chemicals such as the chlorate-borate mixtures, achieve this object primarily by subjecting the plant to what may be termed "biological shock," characterized by freezing of the leaves and chlorosis, stunting, burning of the plant and the like, as opposed to pure defoliation in which the abscission cells in the leaf petiole are selectively affected to cause the leaves to fall off while leaving the remainder of the plant unharmed. To achieve substantially pure defoliation is particularly important when treating cotton plants where the presence of burned leaves frozen to the plant can deleteriously affect both yield and quality of the harvested crop. My invention is directed specifically to defoliating cotton plants; other plants, such as beans and soybeans, are not defoliated by use of this invention nor are substantial herbicidal effects induced.

The compounds contemplated for use in this invention possess the ability, to a degree not approached by prior materials, to induce highly selective pure defoliation in cotton. In addition, use of my compounds has been effective in defoliating actively growing cotton normally only treated with great difficulty and, furthermore, has been found to substantially obviate regrowth problems encountered when employing known defoliants. All these desiderata are achieved when employing extremely low (relative to the quantities of known defoliants normally required) concentrations of my materials.

The compounds used in this invention are purine derivatives of the kinetin type and can be represented by the following formula (I)

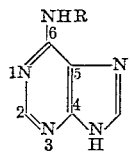

where R can be phenyl and alkyl-substituted phenyl of from 7 to 10 carbon atoms, or benzyl and alkyl-substituted benzyl of from 8 to 11 carbon atoms. Typical compounds within the compass of Formula I and effective in the invention are $N^6$-phenyladenine (or anilinopurine), $N^6$-benzyladenine, as well as $N^6$-2-(or 3-, or 4-, or 5-, or 6-) methyl (or ethyl, or propyl) phenyladenine, and $N^6$-2-(or 3-, or 4-, or 5-, or 6-) methyl (or ethyl, or propyl) benzyladenine.

The compounds used herein possess another advantage, in addition to their unusually high degree of activity, in agricultural applications in that they are organic compounds which will not leave persistent residues in the soil, in contrast to the inorganic defoliants. In addition, the compounds employed herein are derivatives of kinetin which is detoxified by natural processes.

I have found that anilinopurine (where R in Formula I, above, is phenyl) is particularly efficacious as a defoliant in that extremely small quantities thereof cause substantially pure defoliation without herbicidal side effects. The remaining compounds covered by Formula I are also effective but related compounds not covered thereby are totally ineffective. Thus, I have found that compounds wherein R in Formula I is methyl or β-hydroxyethyl, are inactive. Similarly, $N^6,N^6$-di(β-hydroxyethyl) adenine was found to be inoperative. In addition, kinetin itself (where R would be furylmethyl) was found to be inoperative as a defoliant.

The compounds used in my invention are known and can be synthesized according to processes disclosed in the art, e.g. by aminolysis of 6-chloropurine as taught by J. W. Daly and B. E. Christensen in J. Org. Chem. 21, 177–179 (1956), or of 6-methylmercaptopurine in accordance with Hitchings et al., J. Am. Chem. Soc. 74, 411 (1952) or by the teachings in Chemical Abstracts 54, 7057b.

The following examples are illustrative of the exceptional defoliating action of the compounds contemplated herein.

Example I

In a series of greenhouse tests, each test compound was formulated by dissolving one gram of compound in 50 milliliters of acetone in which had been dissolved 0.1 gram (10 percent of the weight of the compound) of an alkylphenoxy polyethoxyethanol surfactant, as an emulsifying or dispersing agent. The resulting solution was mixed into 200 milliliters of water to give 250 milliliters of a suspension containing the compound in finely divided form. The thus-prepared stock suspension was diluted with water to give a test solution containing 2500 parts of test compound per million parts of solution.

Two young cotton plants (Gossypium hirsutum L.) with two secondary leaves fully expanded and third and fourth leaves just appearing were placed on a revolving turntable and sprayed with the test solution for 30 seconds using a hand sprayer set at 40 p.s.i.g. Two control plants were sprayed with a check solution containing no active compound. The plants were removed to the greenhouse and held at 80° F. for ten days and, after this period, the degree of defoliation and the severity of any injury were observed by visual inspection and rated as follows:

Defoliation rating:
  5=excellent defoliation
  4=good defoliation
  3=moderate defoliation
  2=poor defoliation
  1=no defoliation Injury rating:
  5= plant dead
  4=severe desiccation
  3=moderate desiccation
  2=slight burn
  1=no injury Table I sets forth the results obtained.

TABLE I

| Compound | Defoliation Rating | Injury Rating |
|---|---|---|
| $N^6$-benzyladenine | 5 | |
| $N^6$-methyladenine | 1 | 2 |
| $N^6$-β-hydroxyethyladenine | 1 | 1 |
| $N^6,N^6$-di(β-hydroxyethyl) adenine | 1 | 1 |
| $N^6$-n-hexyladenine | 3 | 3 |
| $N^6$-furylmethyladenine (kinetin) | 1 | 1 |

Example II 6-anilinopurine, the most preferred of my compounds, was tested as follows. Mature, boll-bearing cotton plants were sprayed with aqueous solutions of 6-anilinopurine and the proprietary material S,S,S-tributyl phosphorotrithioate to give the indicated dosages in pounds of active compound per acre. The water volume used was equivalent to 120 gallons per acre for all dosages. Ten days after spraying, the plants were examined and each compound was rated as commercially acceptable or commercially unacceptable. These ratings, each one of which was based on two replicates, one replicate consisting of a five-foot row of cotton, are set forth in Table II, below.

TABLE II

| Compound | Defoliation Rating at 2 lbs./acre | Defoliation Rating at 1 lb./acre |
| --- | --- | --- |
| 6-anilinopurine | Commercially acceptable. | Commercially acceptable. |
| S,S,S-tributyl phosphorotrithioate.* | Commercially unacceptable. | Commercially unacceptable. |

*A commercial defoliant known as "DEF" and sold by the Chemgro Corporation, U.S.A.

The cotton plants treated with 6-anilinopurine showed no effects of leaf dessication or other herbicidal effects and thus the action of this compound appeared to be due to systemic activity localized at the site of action, i.e. the abscission zone.

When preparing the defoliants used in this invention, the compounds described above are admixed with an inert carrier. This carrier may be a liquid or a solid and should contain surface active agents. Suitable surface active agents are alkyl phenyl polyethylene glycol ethers, dimeric alkylated aryl polyether alcohols, and the like. A sticker-spreader such as glycerine or a non-volatile solid polyethylene glycol, may also be added to insure adhension of the formulation to the plant after spraying.

Water is an ideal liquid carrier but suitable organic solvents may be employed. Formulation in water suspensions presents the simplest and easiest method of application. Alternatively, application may be made in the form of dusts or powders where the active compounds are admixed with a solid carrier such as clay, attapulgite, pyrophyllite, or talc. The concentration of the acive ingredient in the final formulation, liquid or solid, may be from about 0.1 to about 10 percent by weight.

Generally, the effective amounts of the purine compounds range from about one-fourth to about 10 pounds per acre. The precise concentration, within the broad range, to be used in any given field will depend on the specific soil conditions, the variety and age of the plants to be treated, the amount of foliage present and environmental factors such as temperature, light, humidity and rainfall. Fof example, as the plant approaches maturity, it is more readily defoliated, thus requiring less chemical. Actively growing highly vegetative plants are generally more difficult to defoliate. However, it is one of the features of the compounds contemplated for the use in this invention that actively growing plants may be defoliated.

What is claimed is:

1. Method of selectively defoliating cotton plants without inducing substantial ancillary herbicidal effects, which comprises applying to the plants a defoliatingly effective amount of a purine derivative represented by the formula

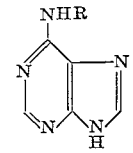

where R is a member chosen from the group consisting of phenyl, alkyl-substituted penyl of from 7 to 10 carbon atoms, benzyl, and alkyl-substituted benzyl of from 8 to 11 carbon atoms.

2. Method of selectively defoliating cotton plants without inducing substantial ancillary herbicidal effects, which comprises applying to the plants a defoliatingly effective amount of $N^6$-phenyladenine.

3. Method of selectively defoliating cotton plants without inducing substantial ancillary herbicidal effects, which comprises applying to the plants a defoliatingly effective amount of $N^6$-benzyladenine.

References Cited by the Examiner

UNITED STATES PATENTS 2,653,087  9/1953  Skoog _____ 71—2.5
3,070,432  12/1962  Strong et al. _____ 71—2.5

LEWIS GOTTS, *Primary Examiner.*

J. O. THOMAS, *Examiner.*